US009680772B2

(12) United States Patent
Kothari et al.

(10) Patent No.: US 9,680,772 B2
(45) Date of Patent: Jun. 13, 2017

(54) SYSTEM AND METHOD FOR MANAGING CONFIGURATION OF VIRTUAL SWITCHES IN A VIRTUAL MACHINE NETWORK

(71) Applicant: VMware, Inc., Palo Alto, CA (US)

(72) Inventors: Piyush Kothari, Palo Alto, CA (US); Mukesh Baphna, Milpitas, CA (US); ChiHsiang Su, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 234 days.

(21) Appl. No.: 14/022,036

(22) Filed: Sep. 9, 2013

(65) Prior Publication Data

US 2015/0074661 A1 Mar. 12, 2015

(51) Int. Cl.
| | |
|---|---|
| G06F 15/177 | (2006.01) |
| H04L 12/931 | (2013.01) |
| H04L 12/939 | (2013.01) |
| G06F 9/455 | (2006.01) |
| H04L 12/24 | (2006.01) |

(52) U.S. Cl.
CPC .......... *H04L 49/70* (2013.01); *G06F 9/45558* (2013.01); *H04L 41/0859* (2013.01); *H04L 41/0863* (2013.01); *H04L 49/557* (2013.01); *H04L 49/65* (2013.01); *G06F 2009/45595* (2013.01)

(58) Field of Classification Search
CPC ..... H04L 41/08; H04L 41/082; H04L 49/557; H04L 49/65; H04L 49/70
See application file for complete search history.

(56) References Cited

U.S. PATENT DOCUMENTS

| | | | |
|---|---|---|---|
| 6,983,324 B1* | 1/2006 | Block | H04L 69/40 709/204 |
| 7,933,993 B1 | 4/2011 | Skinner | |
| 7,979,517 B1 | 7/2011 | Wang et al. | |
| 8,135,857 B1* | 3/2012 | Eng | H04L 12/6418 709/217 |
| 8,195,774 B2 | 6/2012 | Lambeth et al. | |

(Continued)

OTHER PUBLICATIONS

International Search Report & Written Opinion, PCT/US2014/054219, Oct. 31, 2014.

(Continued)

*Primary Examiner* — Arvin Eskandarnia
*Assistant Examiner* — Austin Moreau

(57) ABSTRACT

Techniques for managing configuration of virtual switches in a virtual machine network are disclosed. In an embodiment, a virtual machine network that includes virtual switches is configured to revert back to a saved network configuration if a configuration change causes the connection between the VM management system and a managed node to be lost. For example, before any configuration changes are made, the active configuration is saved. If the new configuration supports a working connection between the managed node and the VM management system, then the saved configuration is no longer needed and can be flushed from memory. If, however, the new configuration causes the managed node to be disconnected from the VM management system, then the system reverts back to the saved configuration that was previously known to work. The saved configuration is used to reestablish the connection so that the network continues to function.

18 Claims, 9 Drawing Sheets

(56) References Cited

U.S. PATENT DOCUMENTS

| | | | |
|---|---|---|---|
| 8,274,993 B2 | 9/2012 | Sharma et al. | |
| 8,370,530 B2 | 2/2013 | Tripathi et al. | |
| 8,385,202 B2 | 2/2013 | Kuik et al. | |
| 8,635,614 B2 | 1/2014 | Biswas et al. | |
| 9,021,116 B2 | 4/2015 | Kotha et al. | |
| 9,432,254 B1 | 8/2016 | Naqvi | |
| 2003/0051049 A1* | 3/2003 | Noy | H04L 41/08 709/238 |
| 2003/0115256 A1 | 6/2003 | Brockway et al. | |
| 2007/0038679 A1 | 2/2007 | Ramkumar et al. | |
| 2008/0244028 A1 | 10/2008 | Le et al. | |
| 2009/0157846 A1 | 6/2009 | Shimozono et al. | |
| 2010/0232443 A1 | 9/2010 | Pandey | |
| 2011/0022695 A1 | 1/2011 | Dalal et al. | |
| 2013/0055092 A1 | 2/2013 | Cannon et al. | |
| 2013/0055244 A1 | 2/2013 | Cannon et al. | |
| 2013/0086236 A1 | 4/2013 | Baucke et al. | |
| 2013/0144992 A1* | 6/2013 | Barabash | H04L 41/0809 709/220 |
| 2013/0148511 A1* | 6/2013 | Banga | H04L 41/082 370/250 |
| 2013/0166703 A1* | 6/2013 | Hammer | H04L 41/50 709/220 |
| 2013/0174157 A1 | 7/2013 | Elzur | |
| 2013/0262711 A1 | 10/2013 | Louzoun et al. | |
| 2014/0012966 A1 | 1/2014 | Baphna et al. | |
| 2014/0258479 A1* | 9/2014 | Tenginakai | H04L 41/082 709/220 |
| 2015/0030024 A1* | 1/2015 | Venkataswami | H04L 45/74 370/392 |
| 2015/0058469 A1* | 2/2015 | Li | H04L 43/08 709/224 |

OTHER PUBLICATIONS

Call, Curtis; "This Week: Applying Junos Automation"; Dec. 31, 2011; Part 1—Front Cover—p. 46.

Call, Curtis; "This Week: Applying Junos Automation"; Dec. 31, 2011; Part 2—pp. 47-120.

Call, Curtis; "This Week: Applying Junos Automation"; Dec. 31, 2011; Part 3—pp. 121-192.

Call, Curtis; "This Week: Applying Junos Automation"; Dec. 31, 2011; Part 4—pp. 193-246.

Deshpande, Vyenkatesh; "vSphere 5.1—VDS New Features—Rollback Recovery and Backup Restore—VMware vSphere Blog"; Jan. 22, 2013; https://blogs.vmware.com/vshere/2013/01/vsphere-5-1-vds-new-features-rollback-recovery-and-backup-restore.html; 6 pages.

European Search Report, 14841680, Mar. 17, 2017.

* cited by examiner

SYSTEM AND METHOD FOR MANAGING CONFIGURATION OF VIRTUAL SWITCHES IN A VIRTUAL MACHINE NETWORK

BACKGROUND

Software applications, such as virtual machines (VMs), may be executed by a group, or "cluster," of host computing devices. Each VM creates an abstraction of the physical computing resources, such as a processor and memory, of the host executing the VM and executes a "guest" operating system, which, in turn, executes one or more software applications. To the guest operating system and software applications, the abstracted resources may be functionally indistinguishable from the underlying physical resources.

Within a particular host computing device, virtual switches can be used to communicate data packets between the VMs and between other nodes in a network. For example, virtual switches that emulate physical Ethernet switches have been implemented within host computing devices to enable the communication of data packets between VMs.

As with physical data packet switches, virtual switches need certain networking parameters to be configured to establish working connections between nodes. In a large network that can include hundreds of host computing devices and thousands of VMs, centralized management systems have been developed to allow an administrator to manage network configuration tasks. Centralized management systems require working network connections between the virtual switches and the management system to communicate configuration information. However, in some cases, configuration changes called out from the management system may cause connections between the management system and the virtual switches to be lost. If a virtual switch becomes disconnected from the management system, reconnecting the virtual switch to the management is typically a labor-intensive and tedious task.

SUMMARY

Techniques for managing configuration of virtual switches in a virtual machine network are disclosed. In an embodiment, a virtual machine network that includes virtual switches is configured to revert back to a saved network configuration if a configuration change causes the connection between the VM management system and a managed node (e.g., a virtual switch) to be lost. For example, before any configuration changes are made, the active configuration is saved. If the new configuration supports a working connection between the managed node and the VM management system, then the saved configuration is no longer needed and can be flushed from memory. If, however, the new configuration causes the managed node to be disconnected from the VM management system, then the system reverts back to the saved configuration that was previously known to work. The saved configuration is used to reestablish the connection so that the network continues to function. Enabling the network to revert back to a saved configuration in the event of a failed connection provides an efficient alternative to the conventional labor-intensive and tedious tasks that are typically used to reconnect to a managed node.

In an embodiment, a non-transitory computer-readable storage medium containing program instructions for managing the configuration of virtual switches from a central virtual machine management system in a virtual machine network is disclosed. Execution of the program instructions by one or more processors causes the one or more processors to perform steps including establishing a communications connection between a virtual switch and a virtual machine management system using a first configuration, saving the first configuration, changing the configuration from the first configuration to a second configuration via the virtual machine management system, and determining if the virtual machine management system is able to communicate with the virtual switch after the configuration is changed. If it is determined that the virtual machine management system is able to communicate with the virtual switch after the configuration is changed, then the saved first configuration is flushed. If it is determined that the virtual machine management system is not able to communicate with the virtual switch after the configuration is changed, then the configuration is changed from the second configuration back to the first configuration using the saved configuration and the virtual machine management system is reconnected to the virtual switch using the first configuration.

In another embodiment, a method for managing the configuration of virtual switches from a central virtual machine management system in a virtual machine network is disclosed. The method involves establishing a communications connection between a virtual switch and a virtual machine management system using a first configuration, saving the first configuration, changing the configuration from the first configuration to a second configuration via the virtual machine management system, and determining if the virtual machine management system is able to communicate with the virtual switch after the configuration is changed. If it is determined that the virtual machine management system is able to communicate with the virtual switch after the configuration is changed, then the method involves flushing the saved first configuration. If it is determined that the virtual machine management system is not able to communicate with the virtual switch after the configuration is changed, then the method involves changing the configuration from the second configuration back to the first configuration using the saved configuration and reconnecting the virtual machine management system to the virtual switch using the first configuration.

In another embodiment, a computer system is disclosed. The computer system includes at least one host computing device, the host computing device including a processor and memory for running instantiated virtual machines and instantiated virtual switches thereon and a virtual machine management system configured to manage the virtual machines and virtual switches. The at least one computing device and the virtual machine management system are configured to establish a communications connection between a virtual switch and a virtual machine management system using a first configuration, save the first configuration, change the configuration from the first configuration to a second configuration via the virtual machine management system, and determine if the virtual machine management system is able to communicate with the virtual switch after the configuration is changed. If it is determined that the virtual machine management system is able to communicate with the virtual switch after the configuration is changed, then the saved first configuration is flushed. If it is determined that the virtual machine management system is not able to communicate with the virtual switch after the configuration is changed, then the configuration is changed from the second configuration back to the first configuration using the saved configuration and the virtual machine management system is reconnected to the virtual switch using the first configuration.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
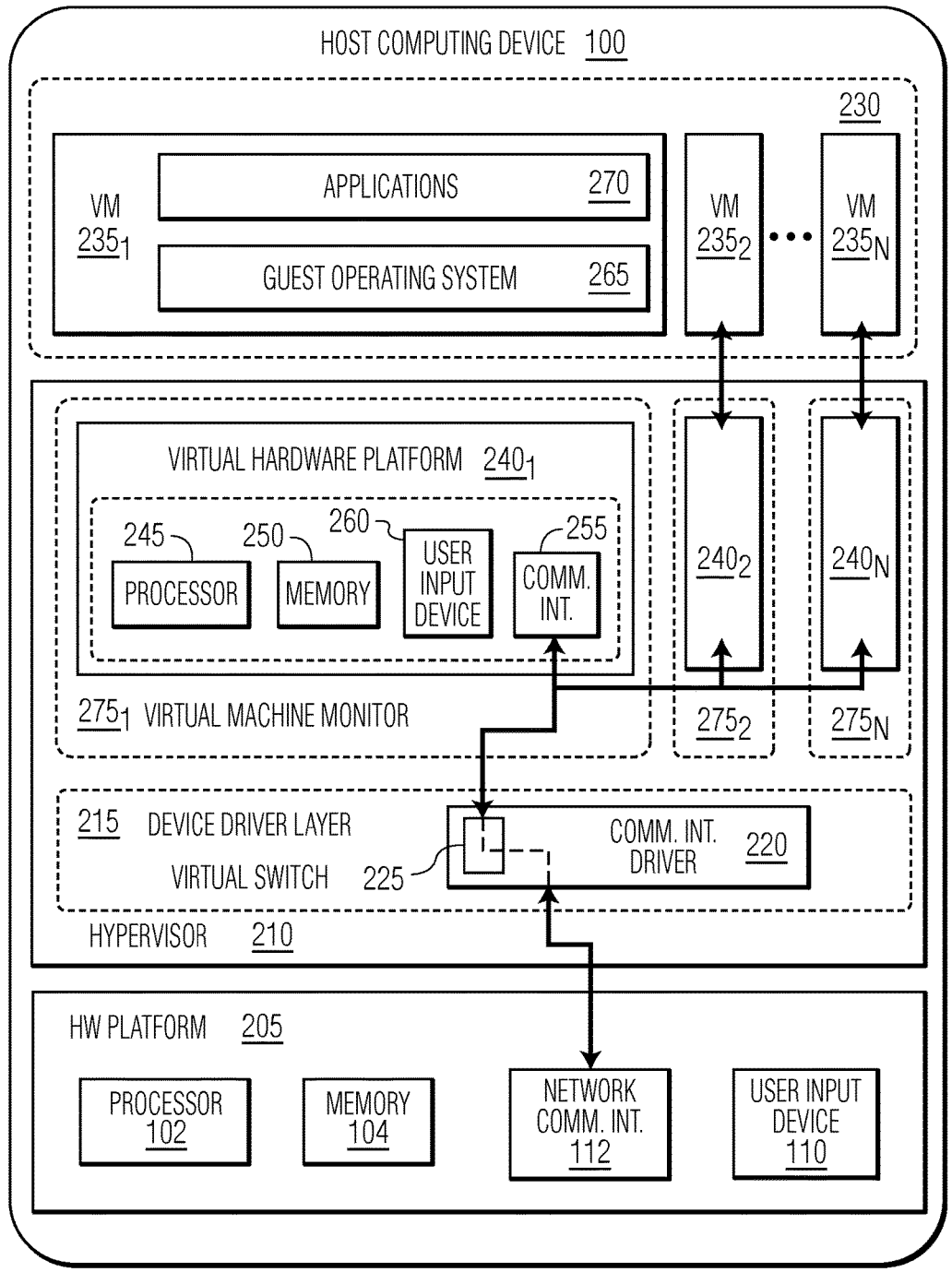
FIG. 1 is a block diagram of a host computing device that supports virtual machines.

FIG. 1 depicts a block diagram of virtual machines (VMs) $235_1$, $235_2$ . . . $235_N$ that are instantiated on a computing device 100, which may be referred to as a "host computing device," a "host," or a "host server." Host computing device 100 includes a hardware platform 205, such as an x86 architecture platform. Hardware platform 205 may include a processor 102, memory 104, a network communication interface 112, a user input device 110, and other input/output (I/O) devices, such as a display device. A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. The hypervisor 210 includes a device driver layer 215, and maps physical resources of the hardware platform 205 (e.g., processor 102, memory 104, network communication interface 112, and/or user input device 110) to "virtual" resources of each of the VMs $235_1$-$235_N$ such that each of the VMs $235_1$-$235_N$ has its own virtual hardware platform (e.g., a corresponding one of virtual hardware platforms $240_1$-$240_N$). Each virtual hardware platform includes its own emulated hardware (such as a processor 245, memory 250, a network communication interface 255, and a user input device 260).

In some embodiments, the memory 250 in the first virtual hardware platform $240_1$ includes a virtual disk that is associated with or "mapped to" one or more virtual disk images stored in the memory 104 (e.g., a hard disk or solid state disk) of the host computing device 100. The virtual disk image represents a file system (e.g., a hierarchy of directories and files) used by the first virtual machine $235_1$. In addition, or alternatively, virtual disk images may be stored in the memory of one or more remote computing devices, such as in a storage area network (SAN).

The virtual hardware platforms $240_1$-$240_N$ of the host computing device 100 may function as equivalents of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as a guest operating system (OS) 265 in order to execute applications 270 for an instantiated VM, e.g., VM $235_1$-VM $235_N$. Virtual hardware platforms $240_1$-$240_N$ may be considered to be part of virtual machine monitors (VMM) $275_1$-$275_N$, which implement virtual system support to coordinate operations between the hypervisor 210 and corresponding VMs $235_1$-$235_N$. Those with ordinary skill in the art will recognize that the various terms, layers, and categorizations used to describe the virtualization components in the host computing device of FIG. 1 may be referred to differently without departing from their functionality or the spirit or scope of the disclosure. For example, virtual hardware platforms $240_1$-$240_N$ may also be considered to be separate from the VMMs $275_1$-$275_N$, and the VMMs $275_1$-$275_N$ may be considered to be separate from the hypervisor 210. One example of the hypervisor 210 that may be used in an embodiment of the disclosure is included as a component in VMWARE's ESX brand software, which is commercially available from VMWARE, INC.

In the embodiment of FIG. 1, the device driver layer 215 of the host computing device 100 includes a communication interface driver 220 that interacts with the network communication interface 112 to receive and transmit data from, for example, a local area network (LAN) that is connected to the host computing device 100. The communication interface driver 220 also includes a virtual switch 225 that emulates the switching of data packets (e.g., Layer 2 Ethernet packets, where the concept of network layers is described in the Open System Interconnect (OSI) model as defined by the International Standards Organization (ISO)) in a physical network. For example, the virtual switch may switch Ethernet packets between different VMs on the same host computing device or switch Ethernet packets received at the network communication interface 112 to the communication interfaces 255 of the VMs $235_1$-$235_N$. In an embodiment, the network communication interface 112 is a physical network adapter (e.g., an Ethernet network interface card (NIC)) while the communications interfaces 255 are virtual network adapters (e.g., virtual Ethernet NICs). Similar to physical Ethernet NICs, each virtual communication interface is assigned a unique Media Access Control (MAC) address that enables the virtual switch 225 to switch Ethernet packets to and from the VMs. Virtual network adapters and virtual switches are described in more detail below.

In an embodiment, the host computing device 100 is a server that is commonly found in a data center. As an example, the host computing device may be installed with multiple other host computing devices in one or more server racks. Typically, the host computing devices are grouped together in "clusters," which are located within the same server rack.

Figure 2:
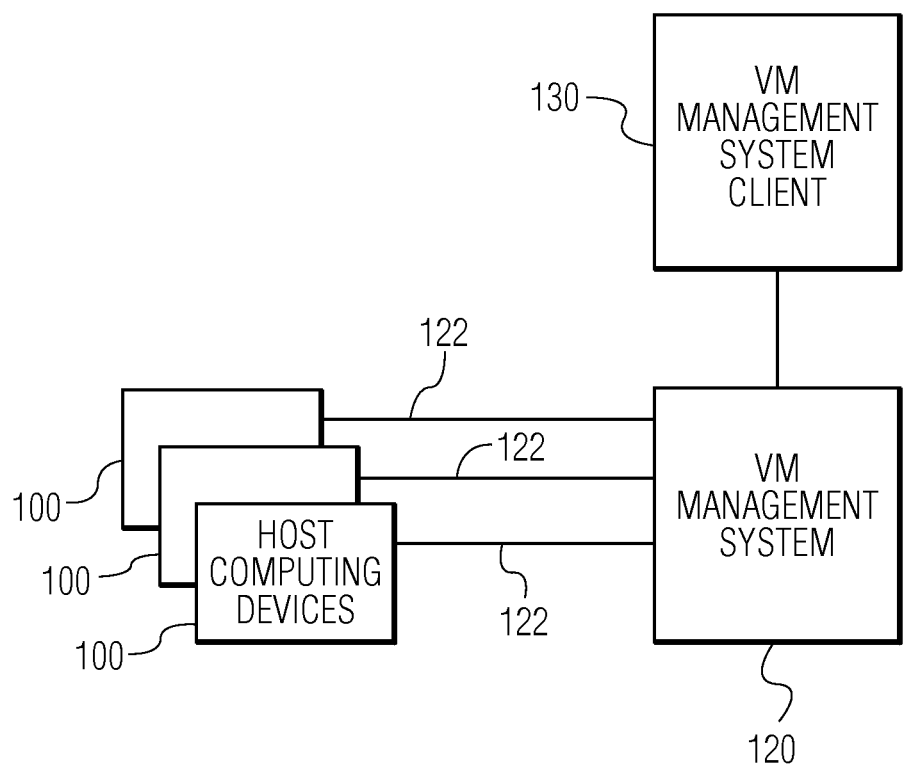
FIG. 2 depicts an embodiment of a computer network that includes multiple host computing devices that are each connected to a virtual machine (VM) management system.

FIG. 2 depicts an embodiment of a computer network that includes multiple host computing devices 100 that are each connected to a VM management system 120 via, for example, LAN and/or WAN connections 122. The host computing devices are configured to deliver virtualization-based services as described above with reference to FIG. 1 and the VM management system is configured to manage the virtual infrastructure, including managing the host computing devices, the virtual machines running within each host computing device, network configuration within the host computing devices, provisioning, migration, resource allocations, and so on. One example of a VM management system that may be used in an embodiment of the disclosure is the VCENTER SERVER brand software, which is commercially available from VMWARE, INC. In an embodiment, the VM management system is run on a server machine that is physically separate from the host computing devices although it is possible that the VM management system is run on one of the host computing devices. In an embodiment, the VM management system is accessible by a user through a VM management system client 130. In one embodiment, the client is a standalone client application and in another embodiment, the client is provided as a web browser application that provides management access from any networked device. The VM management system client allows an administrator to actively manage the virtual infrastructure, including managing the host computing devices, the virtual machines running within each host computing device, network configuration, provisioning, migration, resource allocations, and so on.

As mentioned above with reference to FIG. 1, the host computing device 100 includes the virtual switch 225. In an embodiment, the virtual switch allows the networking of virtual machines in the same way that physical machines are connected. For example, the virtual switch allows virtual machines on a host computing device (e.g., an ESX server) to communicate with each other using the same protocols that would be used over physical switches without the need for additional networking hardware. Virtual switches also support virtual LANs (VLANs) that are compatible with standard VLAN implementations. It is also possible for a single host computing device to include multiple different virtual switches.

Figure 3:
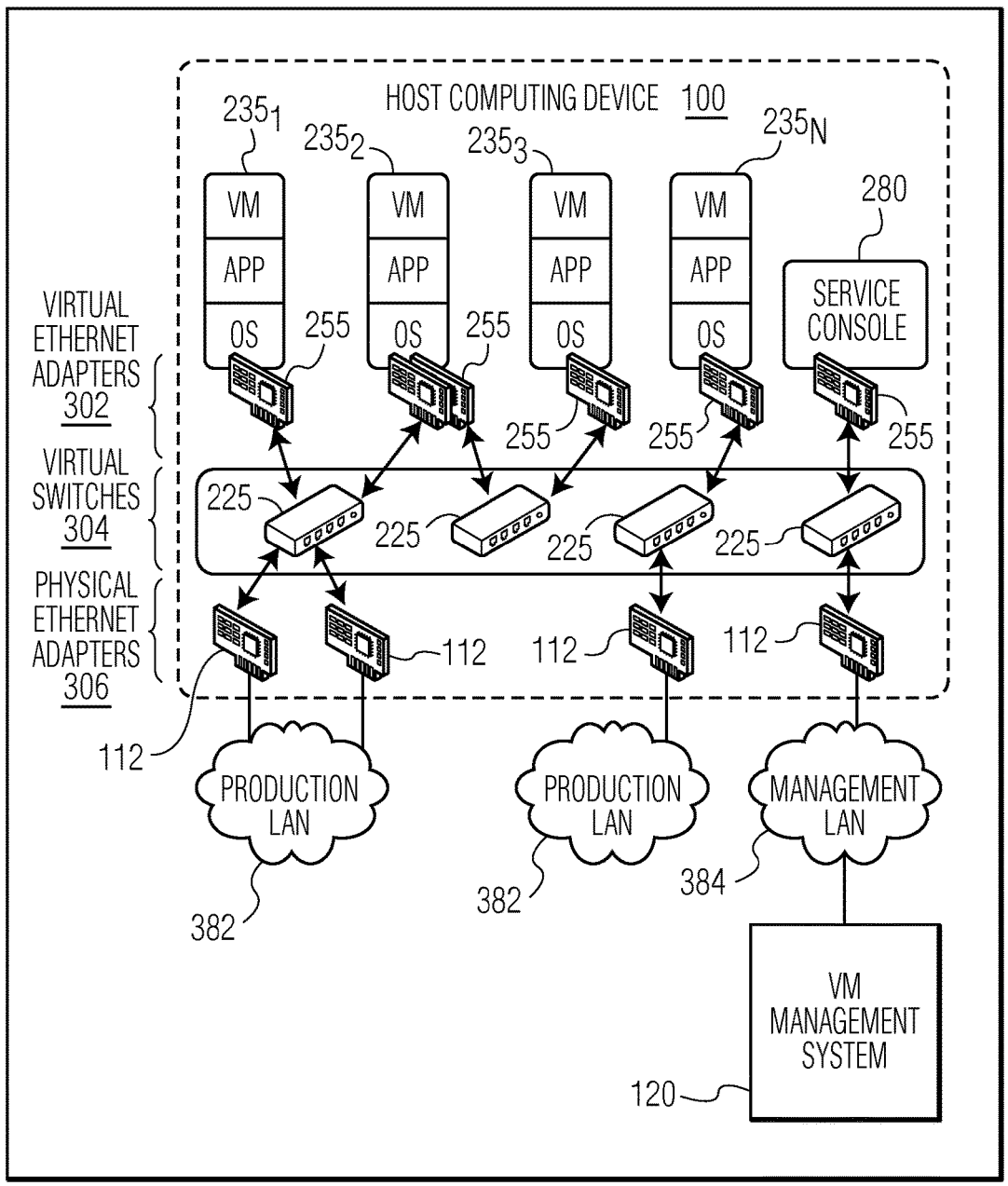
FIG. 3 illustrates the concept of virtual switching in a host computing device that has multiple instantiated VMs.

FIG. 3 illustrates the concept of virtual switching in a host computing device that has multiple instantiated VMs. In the conceptual illustration of FIG. 3, the host computing device 100 includes multiple instantiated VMs (VM $235_1$-VM $235_N$), a service console 280, multiple virtual communications interfaces 255 (e.g., virtual Ethernet adapters), multiple virtual switches 225, and multiple network communications interfaces 112 (e.g., physical Ethernet adapters). The virtual Ethernet adapters, virtual switches, and physical Ethernet adapters are depicted in bracketed rows 302, 304, and 306, respectively. The physical Ethernet adapters of the host computing device enable the host computing device to connect to different external LANs, including production LANs 382 and a management LAN 384. In an embodiment, the virtual Ethernet adapters have their own MAC addresses and unicast, multicast, and/or broadcast filters and the virtual Ethernet adapters are Layer 2 devices. As illustrated in FIG. 3, a virtual machine can be configured with one or more virtual Ethernet adapters, with each of the virtual Ethernet adapters having a unique IP address and MAC address. Examples of virtual Ethernet adapters include:

vmxnet—a paravirtualized device that works only if VMware Tools is installed in the guest operating system. A paravirtualized device is one designed with specific awareness that it is running in a virtualized environment.

vlance—a virtual device that provides strict emulation of the AMD LANCE PCNet32 Ethernet adapter. It is compatible with most 32-bit guest operating systems. This adapter is used when the flexible network adapter is selected but VMware Tools is not installed in the guest operating system.

e1000—a virtual device that provides strict emulation of the INTEL E1000 Ethernet adapter. This is the virtual Ethernet adapter used in 64-bit virtual machines. It is also available in 32-bit virtual machines.

vswif—a paravirtualized device similar to the vmxnet adapter that is used only by the ESX Server service console.

vmknic—a virtual device in the VMkernel, the software layer that manages most of the physical resources on the ESX Server host. The vmknic adapter is used by the TCP/IP stack that services VMotion, NFS and software iSCSI clients that run at the VMkernel level, and remote console traffic. In an embodiment, the VMkernel is a networking interface that provides network connectivity for the ESX Server.

The virtual switches 225, as implemented on the host computing device 100 (e.g., an ESX Server) work in much the same way as physical Ethernet switches. For example, each virtual switch maintains a MAC:port forwarding table and performs a look up on the destination MAC address of each arriving packet and then forwards the packet to one or more ports for transmission. In an embodiment, up to 248 different virtual switches can be created and simultaneously run on each host computing device.

Figure 4:
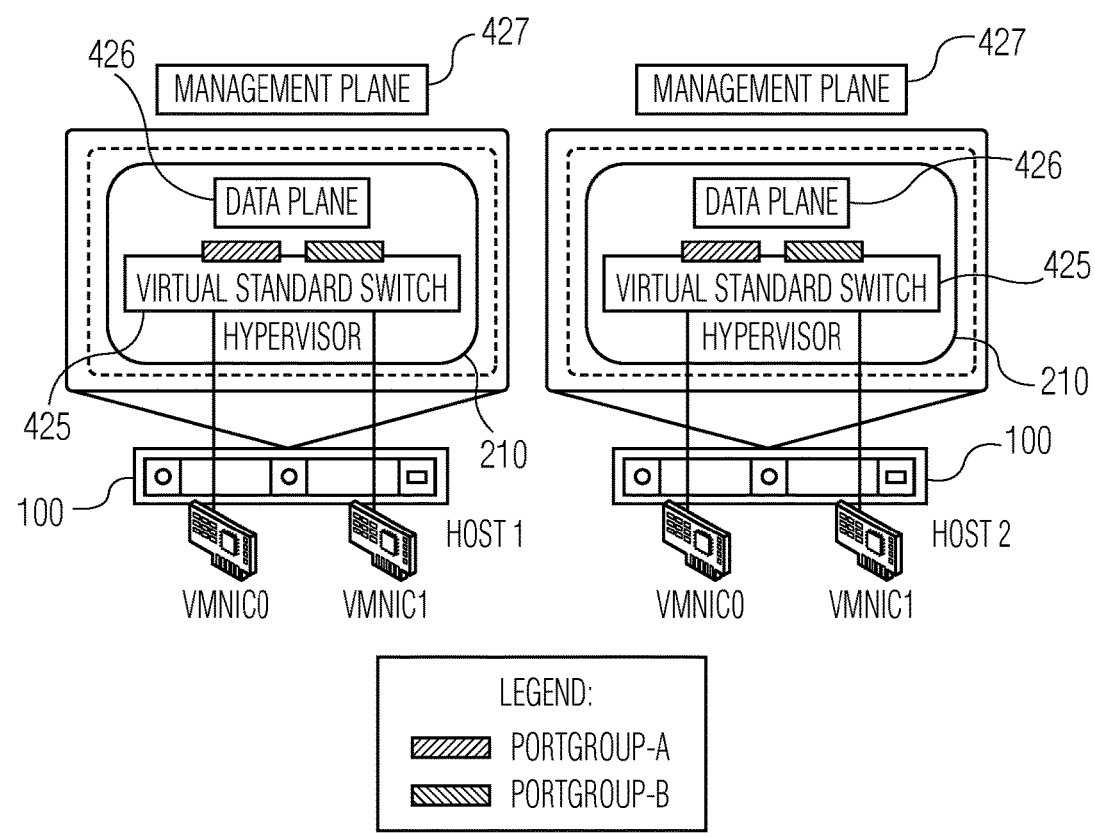
FIG. 4 provides a conceptual illustration of two different virtual standard switches (VSSs) that are implemented on two different host computing devices.

In an embodiment, virtual switches can be implemented as either a virtual standard switch (VSS) or a virtual distributed switch (VDS). FIG. 4 provides a conceptual illustration of two different VSSs that are implemented on two different host computing devices. As shown in FIG. 4, the host computing device 100, identified as "Host 1," runs a hypervisor 210 (e.g., ESX Server) and a VSS 425 is implemented within the hypervisor. The VSS can be thought of as having two planes, a data plane 426 and a management plane 427. The data plane implements the actual packet switching, filtering, tagging, etc. and the management plane is the control structure used to allow an administrator to configure the data plane functionality. The host computing device identified as "Host 2" includes a similar VSS. The data plane and management plane of the respective VSSs are present on the respective host computing devices and an administrator must configure and maintain each VSS on an individual basis.

Figure 5:
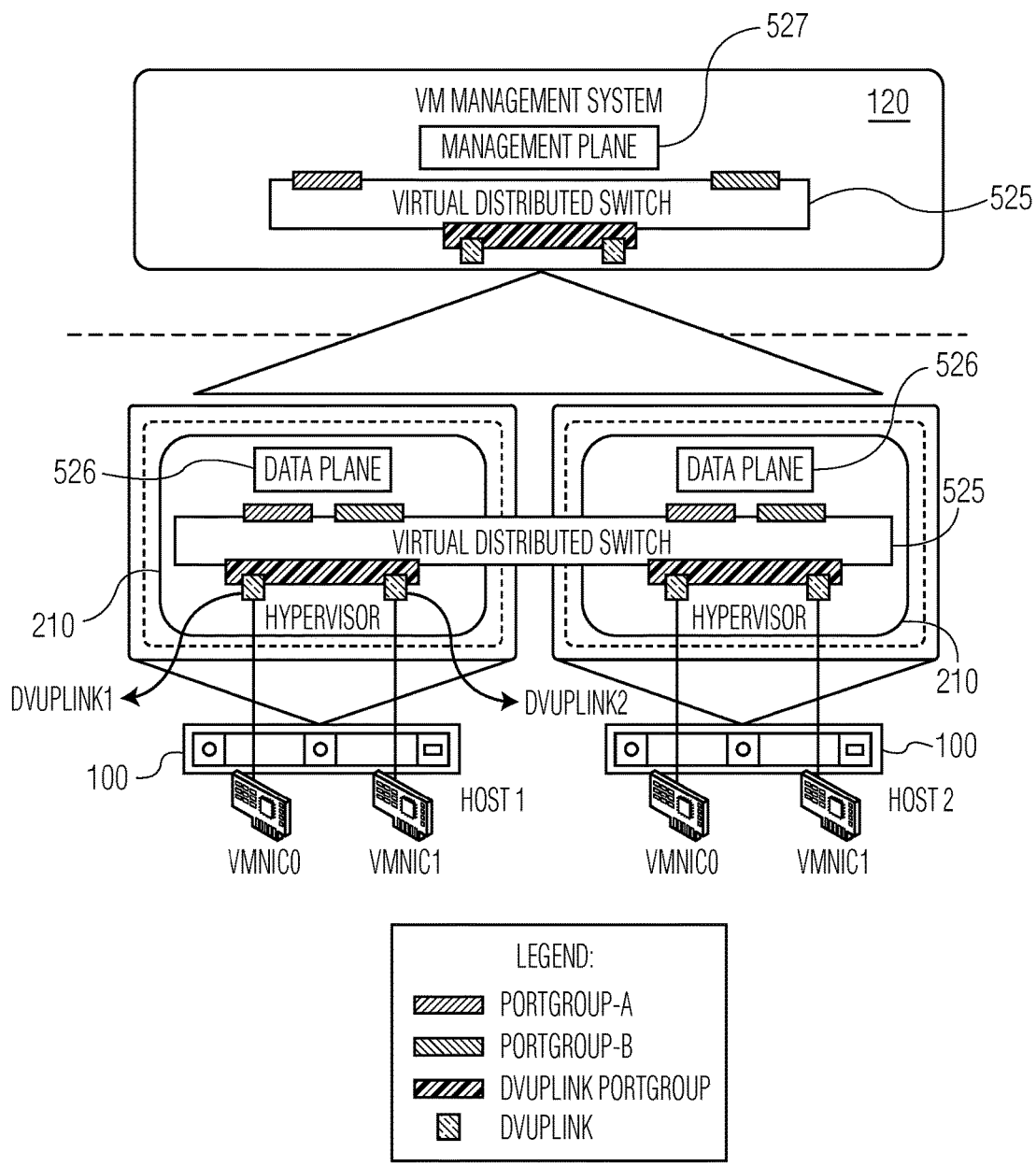
FIG. 5 provides a conceptual illustration of a virtual distributed switch (VDS) that is implemented across two different host computing devices.

FIG. 5 provides a conceptual illustration of a VDS 525 that is implemented across two different host computing devices 100, identified as "Host 1" and "Host 2." A VDS functions as a single virtual switch across all associated host computing devices. One benefit of implementing a VDS across multiple host computing devices is that the VDS allows virtual machines to maintain a consistent network configuration as the VMs migrate across multiple host computing devices. As shown in FIG. 5, both host computing devices run a hypervisor 210 (e.g., ESX Server) and the VDS is implemented across both of the hypervisors. The VDS can also be thought of as having a data plane 526 and a management plane 527, with the data plane remaining local to each hypervisor but the management plane being centralized in the VM management system 120. The implementation of VDSs can ease the management burden of per-host virtual switch configuration by treating the network as an aggregated resource in which individual host-level virtual switches are abstracted into a single large VDS that spans multiple hosts. In an embodiment, each VM management system (e.g., each VCENTER SERVER instance) can support up to 128 different VDSs and each VDS can be distributed over up to 500 different host computing devices.

In an embodiment, functions implemented by both VSSs and VDSs include forwarding L2 packets, segmenting traffic into VLANs, using and understanding IEEE 802.1q VLAN encapsulation, and traffic shaping for the outbound (TX) traffic. In an embodiment, functions implemented by only VDSs include shaping inbound (RX) traffic, centralized unified management interface through VCENTER SERVER, and Private VLANs (PVLANs).

Referring back to FIG. 3, the virtual switches 225, either VSSs or VDSs, are typically managed from the centralized VM management system 120. If the connection between the VM management system and a managed node (e.g., a host computing device and/or a virtual switch) is lost, the managed node can no longer communicate with the VM management system.

Various different events can cause the connection between the VM management system and a managed node to be lost. These events can be grouped, for example, into two categories, host networking events (e.g., related to VSSs) and distributed switch events (e.g., related to VDSs). Host networking events that may cause a connection to be lost include: updating the speed or duplex of a physical NIC; updating DNS and routing settings; updating teaming and failover policies or traffic shaping policies of a standard port group that contains the management VMkernel network adapter; updating the VLAN of a standard port group that contains the management VMkernel network adapter; increasing the maximum transmission unit (MTU) of management VMkernel network adapters and a corresponding virtual switch to values not supported by the physical infrastructure; changing the IP settings of management VMkernel network adapters; and removing the management VMkernal network adapter from a VSS or VDS. Distributed switch events that may cause a connection to be lost include: changing the MTU of a distributed switch; changing the settings (teaming and failover, VLAN, traffic shaping) in the distributed port group of the management VMkernel network adapter; blocking all ports in the distributed port group containing the management VMkernel network adapter; and overriding the policies above for the distributed port to which the management VMkernel network adapter is connected.

When a virtualized environment includes thousands of different VMs running on hundreds of different host computing devices, a configuration change that causes a host or hosts to be disconnected from the VM management system can cause severe disruption in the network. This is especially important when running VDSs. In a VDS environment, where multiple host computing devices are associated with the same VDS, any network failure or misconfiguation of the management port group can potentially disconnect all of the host computing devices from the VM management system. In this situation, the VM management system is not able to centrally make any changes to the VDS configuration (e.g., VDS port group) and push those changes to host computing devices. The primary way to recover from such a disconnection is by going to the individual host computing devices and building a VSS with a proper management network configuration. After all of the management networks of the affected hosts have been reconfigured with a VSS and are able to communicate on the management network, the VM management system can again manage the host computing devices and reconfigure the VDS.

In accordance with an embodiment of the invention, a virtual machine network that includes virtual switches is configured to revert back to a saved network configuration if a configuration change causes the connection between the VM management system and a managed node (e.g., a VSS or VDS) to be lost. For example, before any configuration changes are made, the active configuration is saved. If the new configuration supports a working connection between the managed node and the VM management system, then the saved configuration is no longer needed and can be flushed from the memory of the corresponding host computing device. If, however, the new configuration causes the managed node to be disconnected from the VM management system, then the system reverts back to the saved configuration that was previously known to work. The saved configuration is used to reestablish the connection so that the network continues to function. Enabling the network to revert back to a saved configuration in the event of a failed connection provides an efficient alternative to the conventional labor-intensive and tedious tasks that are typically used to reconnect to a managed node.

Various techniques can be used to determine if the VM management system is connected to a managed node and therefore able to communicate with the managed node. In an embodiment, a known configuration message protocol between the VM management system and a managed node is monitored to determine the status of the connection between the VM management system and the managed node. For example, after making a configuration call to a managed node, the VM management system waits for a predetermined amount of time to see if a certain confirming message, which indicates a working connection, is received. Likewise, after receiving a configuration call from the VM management system, the managed node waits for a predetermined amount of time to see if a certain configuration message is received. Depending on whether certain expected messages are received, the VM management system and/or the managed node can flush the saved configuration if a working connection exists or revert back to the saved configuration and reconnect if the connection is lost.

Figure 6:
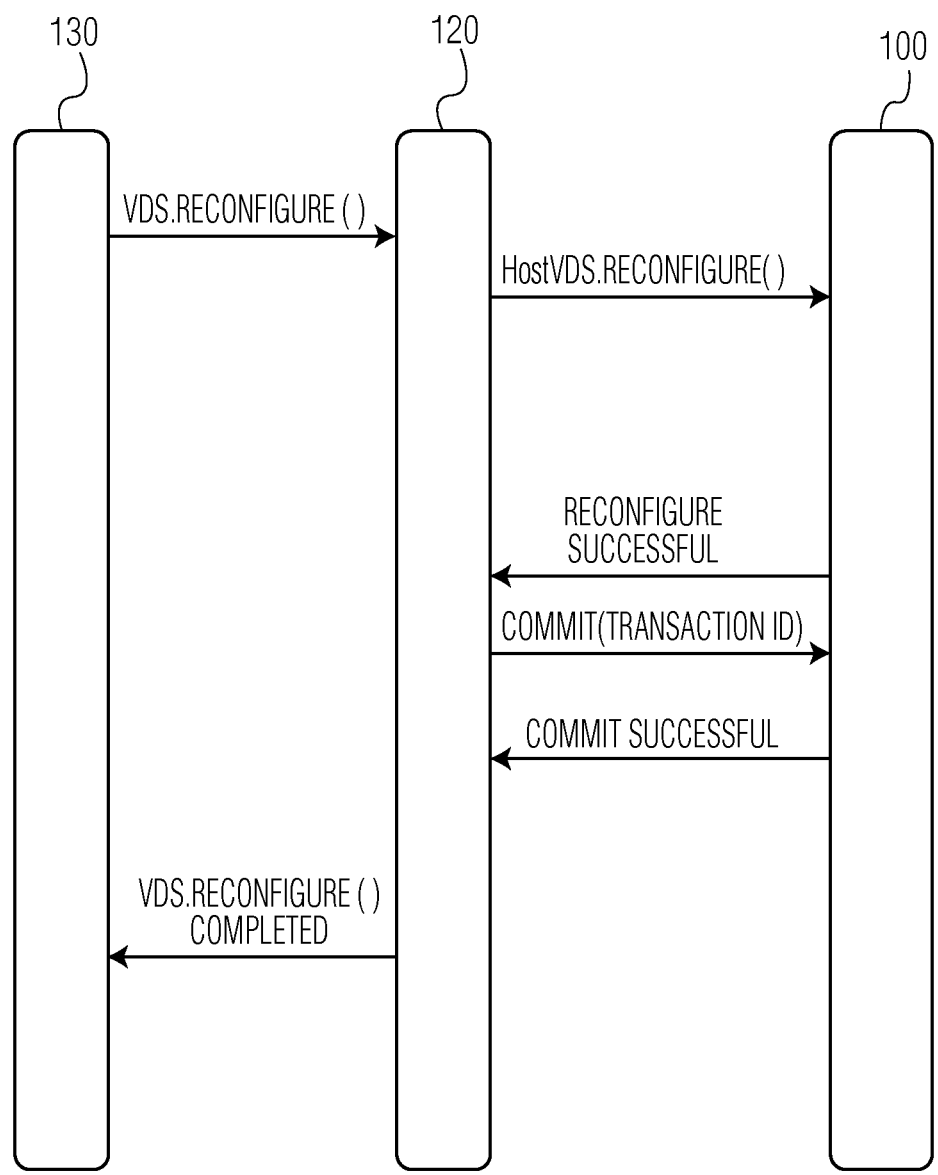
FIG. 6 illustrates a transaction workflow in which a configuration change leaves a working connection between a VM management system and a host computing device in accordance with an embodiment of the invention.
Figure 7:
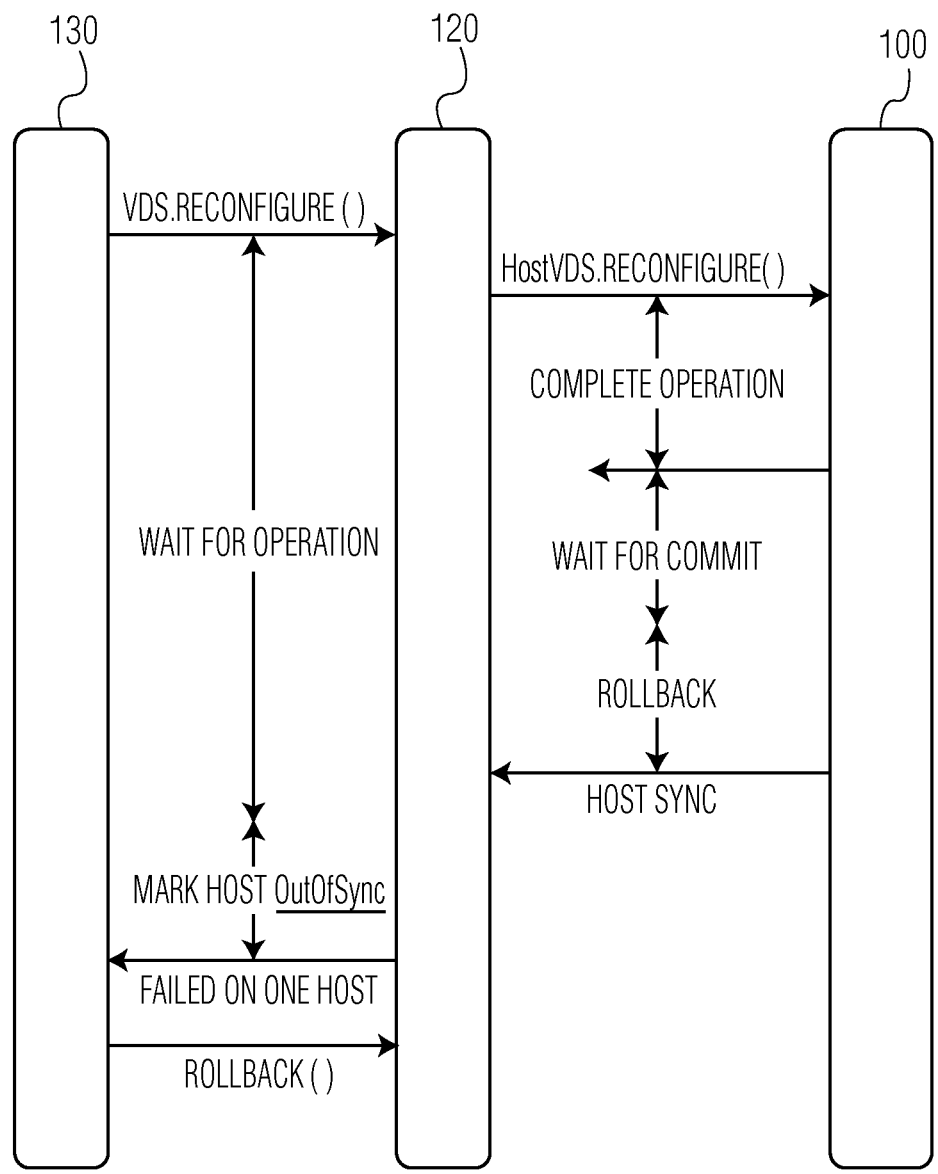
FIG. 7 illustrates a transaction workflow in which a configuration change of a virtual distributed switch results in a lost connection between a VM management system and a managed node in accordance with an embodiment of the invention.
Figure 8:
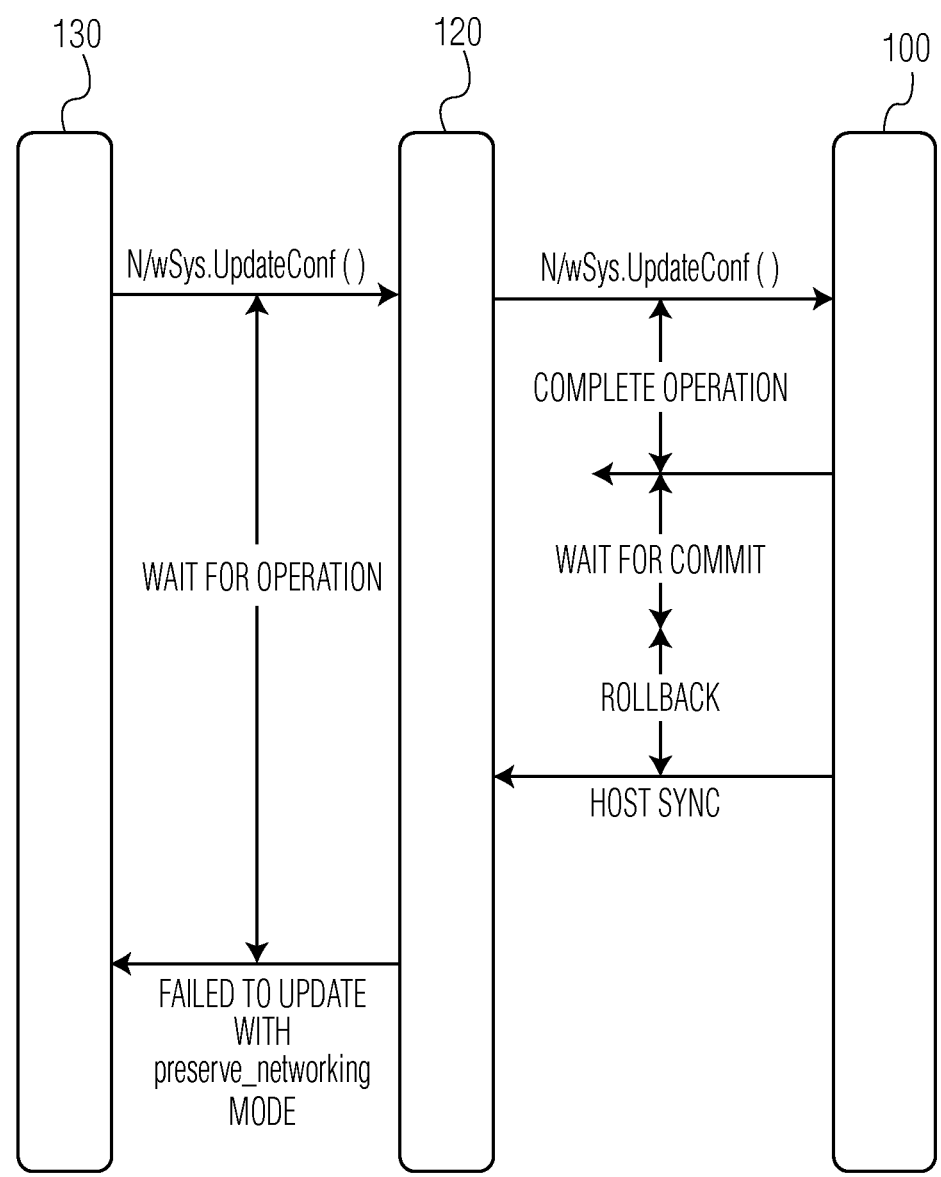
FIG. 8 illustrates another transaction workflow in which a configuration change of a virtual standard switch results in a lost connection between a VM management system and a managed node in accordance with an embodiment of the invention.

FIGS. 6-8 illustrate transaction workflows that utilize the above-described technique to ensure connectivity between the VM management system and a managed node (e.g., the host computing device 100 and/or a virtual switch 225 as described with reference to FIG. 1). FIG. 6 illustrates a case in which a configuration change leaves a working connection between the VM management system and the managed node and FIGS. 7 and 8 depict two cases in which a configuration change results in a lost connection between the VM management system and the managed node.

FIG. 6 illustrates a message flow between the VM management system client 130, the VM management system 130, and one of the host computing devices 100 shown in FIG. 2. In an embodiment, the message flow of FIG. 6 is applicable to VDS or port group configuration changes made through the VM management system. In a first operation, a configuration command (VDS.Reconfigure( )) is sent from the VM management system client to the VM management system. In a next operation, the VM management system sends an "Invoke Transaction" call (HostVDS.Reconfigure( )) to the host computing device. In an embodiment, the call includes a configuration command and a transaction ID that is created when the VM management system creates the call. Before implementing any change to the configuration at the host computing device, the current configuration is saved at the host computing device.

After saving the current configuration at the host computing device, the host computing device and the VM management system apply the new configuration. Upon application of the new configuration, the host computing device issues a return message (Reconfigure successful) that includes the same transaction ID. Once the VM management system receives the return message from the host computing device and identifies the message as corresponding to the same transaction ID, the VM management system issues a commit call (Commit (transactionID)) to the host computing device. When the host computing device receives the commit call, the connection between the VM management system and the host computing device is confirmed and the saved configuration is flushed from the host computing device. The host computing device also returns a commit call (Commit Successful) to the VM management system, which causes the transaction to complete at the VM management system. In a last operation, the VM management system issues a message (VDS.Reconfigure( ) Completed) to the VM management system client to indicate that the new configuration was successfully implemented.

In some cases, for reasons as explained above, a requested configuration change may cause the connection between the VM management system and a host computing device to be lost. FIG. 7 illustrates a message flow between the VM management system client 130, the VM management system 120, and one of the host computing devices 100 of FIG. 2 in a case where the configuration change causes the connection between the VM management system and the host computing device to be lost. Although the configuration change causes the connection to be lost, the rollback mechanism enables the system to revert back to the saved configuration and restore the previously working connection. In the embodiment of FIG. 7, the message flow is applicable to VDS or port group configuration changes made through the VM management system.

In a first operation, a configuration command (VDS.Reconfiguration) is sent from the VM management system client 130 to the VM management system 120. In a next operation, the VM management system sends an "Invoke Transaction" call (HostVDS.Reconfigure) to the host computing device 100. As described above, the call includes a configuration command and a transaction ID that is created when the VM management system creates the call. Before implementing any change to the configuration at the host computing device, the current configuration is saved at the host computing device. After saving the current configuration, the host computing device and the VM management system apply the new configuration. In this case the new configuration causes the connection between the VM management system and the host computing device to be lost. In some cases, the connectivity between the VM management system and the host computing device may be directional. That is, it may only be the connection from the VM management system to the host computing device that is lost while the connection from the host computing device to the VM management system is still working. In an embodiment, the main concern is whether there is a working connection from the VM management system to the host computing device, not from the host computing device to the VM management system. This is the case because a working connection from the VM management system to the host computing device still supports the communication of configuration information to the host computing device.

In the case where the connection from the host computing device to the VM management system is still working, the Invoke Transaction call may return from the host computing device. If the Invoke Transaction call is returned, a commit call (Commit (transactionID)) is issued from the VM management system but because the host computing device is unreachable, the commit call never reaches the host computing device. After waiting for a preconfigured time out period, which can be set per transaction, the host computing device times out and the configuration state of the host computing device is reverted back to the saved state. In the case where the invoke transaction call is not returned to the VM management system, the VM management system times out and reverts back to the previous state. In either case, the saved configuration can be used to reconnect the VM management system to the managed node so that the VM management system is able to communicate with the managed node. Additionally, as shown in FIG. 7, the VM management system 120 reports to the VM management system client 130 that the host is out of sync.

In an embodiment, the preconfigured time out period is on the order of 30 seconds, although time out periods in the range of 5-60 seconds are possible. Additionally, other time out periods are possible depending on the implementation.

The message flows of FIGS. 6 and 7 correspond to VDSs. A similar approach is applicable to configuration changes for VSSs. FIG. 8 illustrates a message flow between the management center UI 130, the VM management system 120, and one of the host computing devices 100 from FIG. 2 on which a VSS is implemented.

In a first operation, a configuration command (N/wSys. Update Conf( )) is sent from the VM management system client 130 to the VM management system 120. In a next operation, the VM management system sends an "Invoke Transaction" call (N/wSys.Update Conf( )) to the host computing device 100. Before implementing any change to the configuration at the host computing device, the current configuration is saved at the host computing device. After saving the current configuration, the host computing device applies the new configuration and waits for a commit call to be received from the VM management system. However, in this case the new configuration causes the connection between the VM management system and the host computing device to be lost. Therefore, the host computing device will not receive a commit call from the VM management system. After waiting for a preconfigured time out period, which can be set per transaction, the host computing device times out and the configuration state of the host computing device is reverted back to the saved configuration state using the saved configuration. The host computing device reconnects to the VM management system using the saved configuration and sends a synchronization message (Host Sync) to the VM management system. In response to the synchronization message, the VM management system sends a message to the UI to notify the UI that the host computing device failed to update its configuration.

Figure 9:
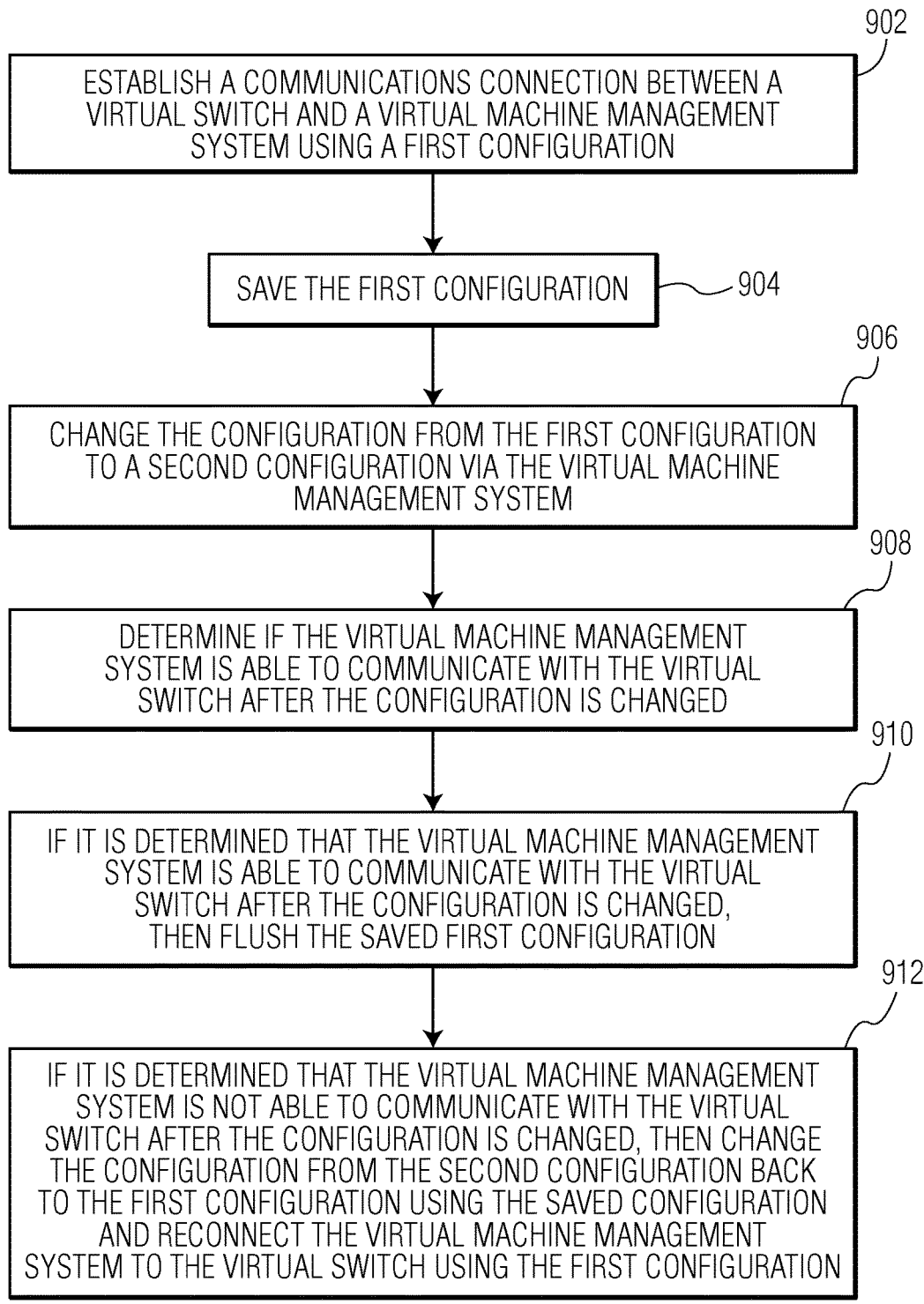
FIG. 9 is a process flow diagram of a technique for managing the configuration of virtual switches from a central management system in a virtual machine environment in accordance with an embodiment of the invention.

A method for managing the configuration of virtual switches from a central virtual machine management system in accordance with an embodiment of the invention is described with reference to a flow diagram of FIG. 9. At block 902 a communications connection is established between a virtual switch and a virtual machine management system using a first configuration. At block 904, the first configuration is saved. At block 906, the configuration is changed from the first configuration to a second configuration via the virtual machine management system. At block 908, it is determined if the virtual machine management system is able to communicate with the virtual switch after the configuration is changed. At block 910, if it is determined that the virtual machine management system is able to communicate with the virtual switch after the configuration is changed, then the saved first configuration is flushed. At block 912, if it is determined that the virtual machine management system is not able to communicate with the virtual switch after the configuration is changed, then the configuration is changed from the second configuration back to the first configuration using the saved configuration and the virtual machine management system is reconnected to the virtual switch using the first configuration.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer readable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A non-transitory computer-readable storage medium containing program instructions for managing the configuration of virtual switches from a central virtual machine management system in a virtual machine network, wherein execution of the program instructions by one or more processors causes the one or more processors to perform steps comprising:

establishing a communications connection between a virtual switch and a virtual machine management system using a first configuration;

saving the first configuration at the viral switch;

changing the configuration of the virtual switch from the first configuration to a second configuration in accordance with a call sent from the virtual machine management system to the virtual switch, the call including a transaction ID that is created by the virtual machine management system when the virtual machine management system creates the call and a configuration command directing the virtual switch to change to the second configuration;

issuing a return message from the virtual switch to the virtual machine management system with the same transaction ID as the call sent from the virtual machine management system to the virtual switch;

determining if the return message with the same transaction ID as in the call is received by the virtual machine management system from the virtual switch after the configuration is changed;
if the return message with the same transaction ID is received after the configuration is changed, then sending a call, the call including the transaction ID, from the virtual machine management system to the virtual switch to confirm the changed configuration and flushing the saved first configuration from the virtual switch; and
if the return message with the same transaction ID is not received after the configuration is changed, then changing the configuration from the second configuration back to the first configuration using the saved first configuration and reconnecting the virtual machine management system to the virtual switch using the saved first configuration.

2. The non-transitory computer-readable storage medium of claim 1, wherein determining if a return with the same transaction ID as in the call message is received by the virtual machine management system after the configuration is changed comprises monitoring a configuration message protocol between the virtual machine management system and the virtual switch.

3. The non-transitory computer-readable storage medium of claim 1, wherein determining if a return message with the same transaction ID as in the call is received by the virtual machine management system after the configuration is changed comprises monitoring a configuration message protocol between the virtual machine management system and the virtual switch to see if a certain confirming message is received within a preconfigured time out period.

4. The non-transitory computer-readable storage medium of claim 3, wherein preconfigured time out period is in the range of 5- 60 seconds.

5. The non-transitory computer-readable storage medium of claim 1, wherein determining if a return message with the same transaction ID as in the call is received by the virtual machine management system after the configuration is changed comprises monitoring a configuration message protocol between the virtual machine management system and the virtual switch to see if a certain confirming message is received within a preconfigured time out period and wherein the configuration is a Layer 2 Ethernet configuration and wherein changing a configuration involves changing a configuration of a virtual distributed switch.

6. The non-transitory computer-readable storage medium of claim 1, wherein the configuration is a Layer 2 configuration.

7. The non-transitory computer-readable storage medium of claim 1, wherein the configuration is a Layer 2 Ethernet configuration.

8. The non-transitory computer-readable storage medium of claim 1, wherein changing a configuration involves changing a configuration of a virtual standard switch.

9. The non-transitory computer-readable storage medium of claim 1, wherein changing a configuration involves changing a configuration of a virtual distributed switch.

10. The non-transitory computer-readable storage medium of claim 1, wherein the first configuration is saved at a host computing device on which the virtual switch is instantiated.

11. The non-transitory computer-readable storage medium of claim 1, wherein the first configuration is saved at a host computing device on which the virtual switch is instantiated and then flushed from the host computing device if it is determined that the return message with the same transaction ID as in the call is received by the virtual machine management system after the configuration is changed.

12. The non-transitory computer-readable storage medium of claim 1, wherein the communications connection established between the virtual switch and the virtual machine management system utilizes Ethernet.

13. The non-transitory computer-readable storage medium of claim 1, wherein determining if a return message with the same transaction ID as in the call is received by the virtual machine management system after the configuration is changed comprises determining if the virtual machine management system is able to communicate with the virtual switch using Ethernet.

14. A method for managing the configuration of virtual switches from a central virtual machine management system in a virtual machine network, the method comprising:
establishing a communications connection between a virtual switch and a virtual machine management system using a first configuration;
saving the first configuration at the virtual switch;
changing the configuration of the virtual switch from the first configuration to a second configuration in accordance with a call sent from the virtual machine management system to the virtual switch, the call including a transaction ID that is created by the virtual machine management system when the virtual machine management system creates the call and a configuration command directing the virtual switch to change to the second configuration;
issuing a return message from the virtual switch to the virtual machine management system with the same transaction ID as the call sent from the virtual machine management system to the virtual switch;
determining if the return message with the same transaction ID as in the call is received by the virtual machine management system from the virtual switch after the configuration is changed;
if the return message with the same transaction ID is received after the configuration is changed, then sending a call, the call including the transaction ID, from the virtual machine management system to the virtual switch to confirm the changed configuration and flushing the saved first configuration from the virtual switch; and
if the return message with the same transaction ID is not received after the configuration is changed, then changing the configuration from the second configuration back to the first configuration using the saved first configuration and reconnecting the virtual machine management system to the virtual switch using the saved first configuration.

15. The method of claim 14, wherein the first configuration is saved at a host computing device on which the virtual switch is instantiated and then flushed from the host computing device if it is determined that the virtual machine management system is able to communicate with the virtual switch after the configuration is changed.

16. A computer system comprising:
at least one host computing device, the host computing device including a processor and memory for running instantiated virtual machines and instantiated virtual switches thereon; and
a virtual machine management system configured to manage the virtual machines and virtual switches;

the at least one computing device and the virtual machine management system being configured to:

establish a communications connection between a virtual switch and a virtual machine management system using a first configuration;

save the first configuration at the virtual switch;

change the configuration of the virtual switch from the first configuration to a second configuration in accordance with a call sent from the virtual machine management system to the virtual switch, the call including a transaction ID that is created by the virtual machine management system when the virtual machine management system creates the call and a configuration command directing the virtual switch to change to the second configuration;

issue a return message from the virtual switch to the virtual machine management system with the same transaction ID as the call sent from the virtual machine management system to the virtual switch;

determine if the return message with the same transaction ID as in the call is received by the virtual machine management system from the virtual switch after the configuration is changed;

if the return message with the same transaction ID is received after the configuration is changed, then send a call, the call including the transaction ID, from the virtual machine management system to the virtual switch to confirm the changed configuration and flush the saved first configuration from the virtual switch; and if the return message with the same transaction ID is not received after the configuration is changed, then change the configuration from the second configuration back to the first configuration using the saved first configuration and reconnect the virtual machine management system to the virtual switch using the saved first configuration.

17. The computer system of claim 16, wherein determining if a return message with the same transaction ID as in the call is received by the virtual machine management system after the configuration is changed comprises monitoring a configuration message protocol between the virtual machine management system and the virtual switch to see if a certain confirming message is received within a preconfigured time out period.

18. The computer system of claim 16, wherein the first configuration is saved at a host computing device on which the virtual switch is instantiated and then flushed from the host computing device if it is determined that the virtual machine management system is able to communicate with the virtual switch after the configuration is changed.

* * * * *